United States Patent
Stadelmann et al.

(10) Patent No.: US 7,797,243 B2
(45) Date of Patent: Sep. 14, 2010

(54) METHOD AND SYSTEM FOR CONTENT-BASED BILLING IN IP NETWORKS

(75) Inventors: Toni Stadelmann, Bolligen (CH); Walter Heutschi, Jegenstorf (CH); Peter Zbaren, Kaufdorf (CH); Hans Ulrich Paul, Hinterkappelen (CH)

(73) Assignee: Togewa Holding AG, Bern (CH)

( * ) Notice: Subject to any disclaimer, the term of this patent is extended or adjusted under 35 U.S.C. 154(b) by 347 days.

(21) Appl. No.: 11/547,444

(22) PCT Filed: May 12, 2004

(86) PCT No.: PCT/EP2004/050777

§ 371 (c)(1),
(2), (4) Date: Nov. 9, 2006

(87) PCT Pub. No.: WO2005/117342

PCT Pub. Date: Dec. 8, 2005

(65) Prior Publication Data

US 2008/0109331 A1    May 8, 2008

(51) Int. Cl.
*G06F 21/00* (2006.01)
(52) U.S. Cl. .................. 705/52; 455/405; 455/406; 455/410; 455/411; 455/433
(58) Field of Classification Search .............. 705/59, 705/52; 455/405–406, 410–411, 433
See application file for complete search history.

(56) References Cited

U.S. PATENT DOCUMENTS 5,657,373 A * 8/1997 Hermansson et al. .... 455/435.2

(Continued)

FOREIGN PATENT DOCUMENTS

WO    WO 02/073934 A2    9/2002

(Continued)

OTHER PUBLICATIONS

Hillebrand, Friedhelm. GSM and UMTS: The Creation of Global Mobile Communication. John Wiley and Sons, 2002. p. 523.*

*Primary Examiner*—Andrew J. Fischer
*Assistant Examiner*—Monica Mandel
(74) *Attorney, Agent, or Firm*—Oblon, Spivak, McClelland, Maier & Neustadt, L.L.P.

(57) ABSTRACT

A method and system for content-based billing in IP-networks, carry out and transmit to a control gateway module the authentication and/or service authorization of an IP-node based on the IMSI of the SIM card of the node for HLR and/or VLR of a GSM network and guide the access of the IP node to the content of a network content provider through said control gateway module, control involved costs by means of the nodule on the base of the access target address, detect call detail records according to the IP-node services by a core engine module, detect at least the identity of the IP-node and/or the time and/or a provider of the required services by means of the call detail records during access to the control gateway module, transmit the data to the billing module and compute call detail records and/or clearing data based thereon and/or TAP files through the billing system of a service provider or a financial institution. The disclosure relates, in particular to the mobile IP nodes in heterogeneous networks.

14 Claims, 3 Drawing Sheets

U.S. PATENT DOCUMENTS

Figure 1:
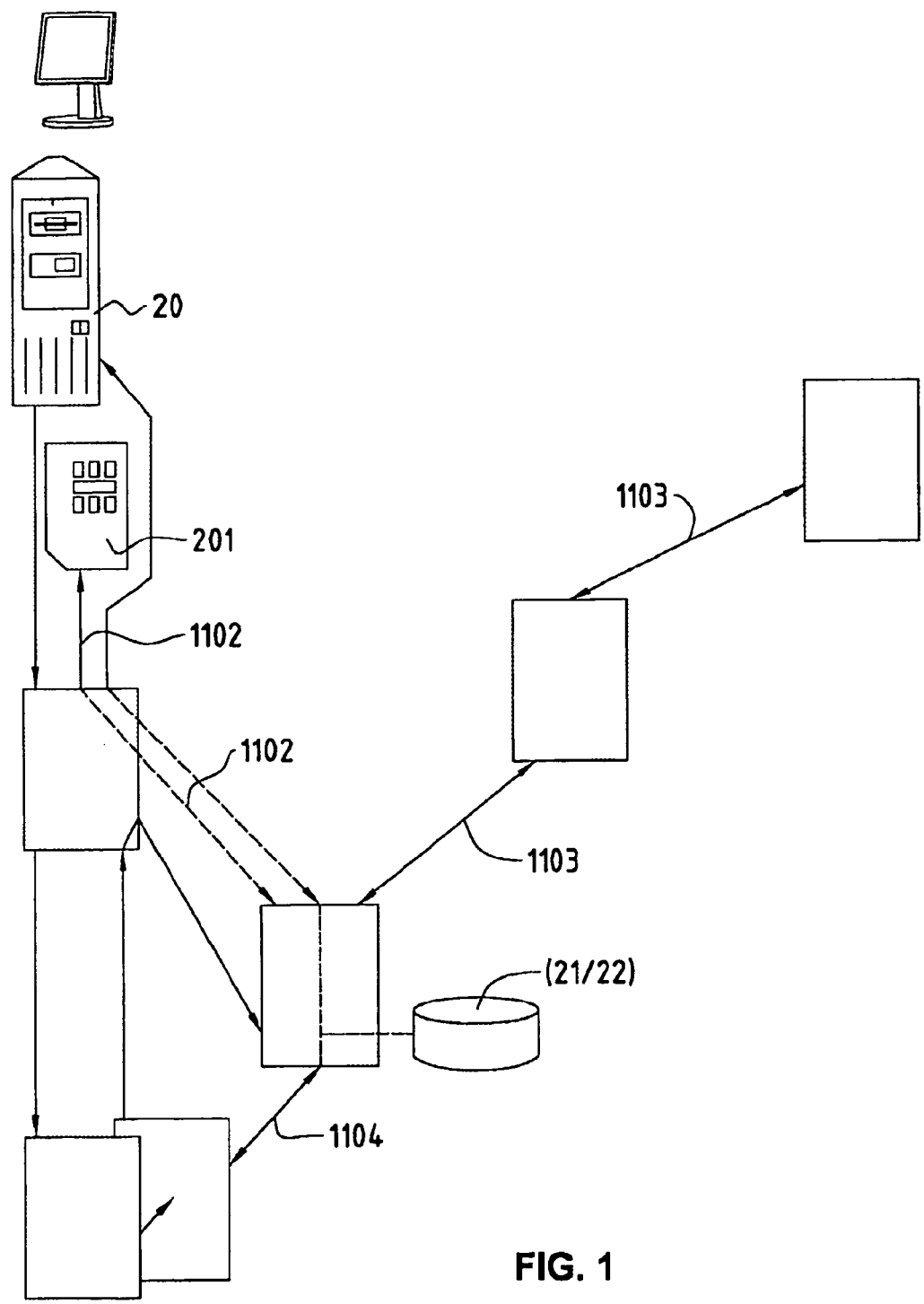

| | | | |
|---|---|---|---|
| 6,324,394 B1 * | 11/2001 | Vazvan | 455/406 |
| 6,466,571 B1 * | 10/2002 | Dynarski et al. | 370/352 |
| 6,515,968 B1 * | 2/2003 | Combar et al. | 370/252 |
| 6,539,237 B1 * | 3/2003 | Sayers et al. | 455/555 |
| 6,553,219 B1 | 4/2003 | Vilander et al. | |
| 6,915,272 B1 * | 7/2005 | Zilliacus et al. | 705/26 |
| 7,171,460 B2 * | 1/2007 | Kalavade et al. | 709/223 |
| 2002/0059614 A1 * | 5/2002 | Lipsanen et al. | 725/75 |
| 2003/0002639 A1 * | 1/2003 | Huie | 379/114.27 |
| 2003/0103506 A1 * | 6/2003 | Keller | 370/392 |
| 2003/0120594 A1 * | 6/2003 | Shaginaw et al. | 705/40 |
| 2003/0157926 A1 | 8/2003 | Ala-Laurila et al. | |
| 2004/0066769 A1 * | 4/2004 | Ahmavaara et al. | 370/338 |

FOREIGN PATENT DOCUMENTS

| | | |
|---|---|---|
| WO | WO 03/050743 A1 | 6/2003 |
| WO | WO 2004/017565 A1 | 2/2004 |

* cited by examiner

METHOD AND SYSTEM FOR CONTENT-BASED BILLING IN IP NETWORKS

The present invention relates to a method and a system for content-based billing in IP networks, where an IP node uses an Internet service provider (ISP) to access charge-incurring contents from one or more content providers in a network, and where the IP node, upon a request, transmits an IMSI stored on a SIM card from the IP node to a control gateway module, and the IMSI from the IP node is stored in a database in a SIM-RADIUS module. The invention relates particularly to mobile IP nodes for roaming in heterogeneous networks.

The number of Internet users worldwide and hence the amount of information it provides has risen exponentially in the last decade. Although the Internet provides worldwide access to information, however, the user does not normally have access to it until he has arrived at a particular network access point, such as in the office, in the school, at the university or at home. The growing supply of IP-compatible appliances, particularly mobile appliances, such as PDAs, mobile radio telephones and laptops, is beginning to alter our conception of the Internet. A similar transition from fixed nodes in networks to more flexible requirements as a result of increased mobility has only just begun. In mobile radio telephony, for example, this trend is also being found in new standards such as WAP, GPRS or UMTS, inter alia. In order to understand the difference between current reality and the IP connection options of the future, a comparison which may be drawn is the development of telephony in the direction of mobility in front of our eyes in the last twenty years. The need for worldwide independent wireless access to LANs with laptops, PDAs etc. in the private and business sectors (e.g. in airports, towns etc., etc.) is immense. However, the WLANs, based on IP, for example, do not provide the service in the way it is produced with GSM/GPRS, for example, which would permit free roaming by the users. These services would need to comprise not only security mechanisms as in the GSM/GPRS but also options for service authorization and for billing, i.e. assignment for the service used etc. On the other hand, such a service is not provided by existing GSM/GPRS operators either. Not just roaming between various WLANs is important, however. The high level of growth in information technology with WLANs (with access to the Internet etc.) and the likewise high level of growth in mobile radio telephony means that it is appropriate to continue these two worlds. Only by combining the two worlds does simple and seamless roaming become possible in the case of wireless LANs, as is customary for mobile radio technology users. There is therefore the need for providers which allow cross-standard roaming between different WLAN service providers and between WLAN service providers and GSM/GPRS service providers.

Computer networks or local area networks (LANs) usually comprise what are known as nodes, which are connected by means of physical media, such as coaxial cable, twisted pairs or optical fiber cables. These LANs are also called wired LANs (wired landline networks). In recent years, wireless LANs have also become ever more popular (e.g. through developments such as the AirPort system from Apple Computers, Inc. etc.). Wireless LANS are especially suited to linking mobile units (nodes), such as laptops, notebooks, PDAs (Personal Digital Assistants) or mobile radios, particularly mobile radio telephones, with an appropriate interface into a local area computer network. The mobile nodes have an adapter which comprises a transmitter/receiver and also a control card (such as an infrared (IR) adapter or low-frequency radio wave adapters). The advantage of such mobile nodes is that they can be moved freely within the range of the wireless LAN. The mobile nodes either communicate directly with one another (peer-to-peer wireless LAN) or send their signal to a base station which amplifies and/or forwards the signal. The base stations may likewise comprise bridge functions. Using such base stations with bridge functions, known as access points (AP), the mobile nodes in the wireless LAN can access a wired LAN. Typical network functions of an access point include transmitting messages from one mobile node to another, sending messages from the wired LAN to a mobile node and transmitting messages from a mobile node to the wired LAN. The physical range of an AP is called the basic service area (BSA). If a mobile node is within an AP's BSA, it can communicate with this AP if the AP is likewise within the signal range (dynamic service area (DSA)) of the mobile node. A plurality of APs are normally associated with one access server, which monitors and manages the authorization of the mobile nodes, inter alia, using a user database. The total area covered by an access server's APs is called the hot spot. Mobile nodes typically have a signal strength of between 100 mwatt and one watt. To connect the wireless LAN to the wired LAN, it is important for the AP to determine whether a particular message (information frame) on the network is intended for a node which is within the wired LAN or within the wireless LAN, in order to forward this information, if required, to the appropriate node. For this purpose, APs have what are known as bridge functions, e.g. based on the IEEE standard Std 802.1D-1990 "Media Access Control Bridge" (31-74 ff). In the case of such bridge functions, a new mobile node in the wireless LAN is typically registered in an FDB (Filtering Database) in the AP in whose range the node is situated. For each information frame on the LAN, the AP compares the destination addresses (MAC addresses (Media Access Control addresses)) which it has stored in the FDB and sends, rejects or transmits the frame to the wired LAN or to the wireless LAN.

In the case of mobile network use, existing IP access by applications on the mobile node should not be interrupted if the user changes his location in the network. On the contrary, all connection and interface changes, e.g. in the event of a change in different hot spots, particularly different networks (Ethernet, mobile radio network, WLAN, Bluetooth etc.), should be able to take place automatically and noninteractively, so that the user does not even need to know about them. This also applies during the use of real time applications, for example. Actual mobile IP computing has many advantages based on stable access to the Internet at any time. Such access makes it possible to work freely and independently of the desk. The demands on mobile nodes in networks differ from the development in mobile radio technology, mentioned at the outset, in various ways, however. The end points in mobile radio are usually humans. In the case of mobile nodes, however, computer applications can implement interactions between other network subscribers without any human action or intervention. Many examples of this can be found in airplanes, ships and automobiles. In particular, mobile computing with Internet access together with other applications, such as in combination with position-finding appliances, such as the satellite-based GPS (Global Positioning System), may thus be appropriate.

One of the problems with mobile network access using the Internet protocol (IP) is that the IP protocol which is used in this regard uses what are known as IP addresses (IP: Internet Protocol) for routing the data packets from the source address to the destination address in a network. These addresses are associated with a fixed location in the network, in a similar manner to the way in which the landline network's telephone numbers are associated with a physical socket. If the destination address for the data packets is a mobile node, this means that for every change of network location a new IP network address needs to be allocated, which makes transparent, mobile access impossible. These problems have been solved by the mobile IP standard (IEFT RFC 2002, October 1996) from the Internet Engineering Task Force (IETF) by virtue of the mobile IP allowing the mobile node to use two IP addresses. One of these is the normal, static IP address (home address) which indicates the location of the home network, while the second is a dynamic IP care-of address which denotes the current location of the mobile node in the network. The association between the two addresses allows the IP data packets to be diverted to the correct, current address of the mobile node.

One of the most frequently used protocols for authenticating a user in a wireless LAN is the open source protocol IEEE 802.1x (in the current version 802.11) from the Institute of Electrical and Electronics Engineers Standards Association. IEEE 802.1x authentication allows authenticated access to IEEE 802 media, such as Ethernet, Token Ring and/or 802.11 wireless LAN. The 802.11 protocol produces a 1 or 2 Mbps transmission in the 2.4 GHz band for wireless LAN, i.e. for wireless, local area networks, using either FHSS (Frequency Hopping Spread Spectrum) or DSSS (Direct Sequence Spread Spectrum). For authentication, 802.1x supports EAP (Extensible Authentication Protocol) and TLS (Wireless Transport Layer Security). 802.11 likewise supports RADIUS. Although the RADIUS support in 802.1x is optional, it is to be expected that most 802.1x authenticators will support RADIUS. The IEEE 802.1x protocol is what is known as a port-based authentication protocol. It can be used in any environment in which a port, i.e. an appliance interface, can be determined. In the case of authentication based on 802.1x, it is possible to distinguish between three units: the appliance of the user (supplicant/client), the authenticator and the authentication server. The authenticator is responsible for authenticating the supplicant. The authenticator and the supplicant are connected by means of a point-to-point LAN segment or an 802.11 wireless link, for example. The authenticator and the supplicant have a defined port, a so-called port access entity (PAE), which defines a physical or virtual 802.1x port. The authentication server produces the authentication services required by the authenticator. It thus verifies the authorization data supplied by the supplicant in terms of the claimed identity.

Authentication servers are usually based on RADIUS (Remote Authentication Dial-In User Service) from the IETF (Internet Engineering Task Force). The use of the RADIUS authentication protocol and account system is widespread for network units, such as routers, modem servers, switches etc., and is used by most Internet service providers (ISPs). When a user dials up an ISP he usually needs to input a user name and a password. The RADIUS server checks this information and authorizes the user for the ISP system. The reason for the spread of RADIUS is, inter alia, that the network units generally cannot handle a very large number of network users which each have different authentication information, since this would exceed the storage capacity of the individual network units, for example. RADIUS allows central management of a large number of network users (addition and deletion of users etc.). By way of example, ISPs (Internet Service Providers) have this as a necessary prerequisite for their service, since their number of users frequently comprises several thousand to several ten thousand users. RADIUS also produces a particular permanent protection against hackers. The remote authentication of RADIUS based on TACACS+ (Terminal Access Controller Access Control System+) and LDAP (Lightweight Directory Access Protocol) is relatively secure against hackers. By contrast, many other remote authentication protocols have only intermittent, unsatisfactory or even no protection against hacker attacks. Another advantage is that RADIUS is currently the de-facto standard for remote authentication, which means that RADIUS is also supported by almost all systems, which is not the case with other protocols.

The aforementioned Extensible Authentication Protocol (EAP) is actually an extension to the PPP (Point-to-Point Protocol) and is defined by Requests for Comments (RFC) 2284 PPP Extensible Authentication Protocol (EAP) from the IETF. A computer can use PPP to connect to an ISP's server, for example. PPP works in the data link layer of the OSI model and sends the computer's TCP/IP packets to the ISP's server, which forms the interface to the Internet. In contrast to the earlier SLIP protocol (Serial Line Internet Protocol), PPP operates in more stable fashion and has error corrections. The Extensible Authentication Protocol is a protocol on a very general level which supports the widest variety of authentication methods, such as Token Cards, Kerberos from Massachusetts Institute of Technology (MIT), scratchlist passwords, certificates, public key authentication and smartcards or what are known as integrated circuit cards (ICCs). IEEE 802.1x defines the specifications for how EAP needs to be integrated into the LAN frames. In the case of communication in wireless networks using EAP, a user uses wireless communication to request access to the wireless LAN from an access point (AP), i.e. a connection HUP for the remote access client or supplicant for the WLAN. The AP then asks the supplicant for the user's identification and transmits the identification to the aforementioned authentication server, which is based on RADIUS, for example. The authentication server allows the access point to verify the user's identification. The AP fetches these authentication data from the supplicant and transmits them to the authentication server, which terminates authentication.

In the case of EAP, an arbitrary authentication method produces a remote access connection. The precise authentication scheme is respectively stipulated between the supplication and the authenticator (i.e. the remote access server, the Internet authentication service (IAS) server or, in the case of WLAN, the access point). As mentioned above, EAP supports a large number of different authentication schemes in this case, such as generic Token Card, MD5 Challenge, Transport Level Security (TLS) for smartcards, S/Key and possible future authentication technologies. EAP allows challenge-response communication between the supplicant and the authenticator which is not limited by the number, the authenticator or the authentication server demanding specific authentication information, and the supplicant, i.e. the remote access client, responding. By way of example, in the case of "security token cards", the authentication server can individually request first a user name and then a PIN (Personal Identity Number) and finally a token card value from the supplicant via the authenticator. Upon each challenge-response pass, a further authentication level is implemented in this case. When all the authentication levels have been answered successfully, the supplicant is authenticated. A specific EAP authentication scheme is denoted as an EAP type. Both parties, i.e. the supplicant and the authenticator, must support the same EAP type so that the authentication can be performed. As mentioned, this is stipulated at the beginning between the supplicant and the authenticator. Authentication servers based on RADIUS normally support EAP, which provides the option of sending EAP messages to a RADIUS server.

In the prior art, EAP-based methods are likewise known for authenticating a user and for allocating session keys to the user using the GSM subscriber identity module (SIM). GSM authentication is based on a challenge-response method. The SIM card's authentication algorithm is given a 128-bit random number (normally called RAND) as challenge. The SIM card then executes a confidential algorithm, specific to the respective operator, which receives as input the random number RAND and a secret key Ki stored on the SIM card and generates a 32-bit response (SRES) and a 64-bit key Kc therefrom. Kc is intended for encrypting the data transfer via wireless interfaces (GSM Technical Specification GSM 03.20 (ETS 300 534): "Digital cellular telecommunication system (phase 2); Security related network functions", European Telecommunications Standards Institute, August 1997). EAP/SIM authentication uses a plurality of RAND challenges for generating a plurality of 64-bit Kc keys. These Kc keys are combined to produce a longer session key. With EAP/SIM the normal GSM extends authentication methods by virtue of the RAND challenges additionally having a message authentication code (MAC) for producing reciprocal authentication. To implement the GSM authentication, the authentication server should have an interface to the GSM network. The authentication server therefore works as a gateway between the Internet authentication service (IAS), the server network and the GSM authentication infrastructure. At the same of EAP/SIM authentication, the authentication server uses a first EAP request by the authenticator to ask the supplicant for the user's International Mobile Subscriber Identity (IMSI), inter alia. With the IMSI, the authentication server obtains n GSM triplets upon request from the authentication center (AuC) for the relevant mobile radio network service provider, normally called a Home Location Register (HLR) or Visitor Location Register (VLR) in the GSM network. From the triplets, the authentication server obtains a message authentication code for n*RAND and a service life for the key (together MAC_RAND) and also a session key. The authentication server can use these to implement the GSM authentication on the supplicant's or user's SIM card. Since RAND together with the Message Authentication Code MAC_RAND is passed to the supplicant, the supplicant becomes able to check whether the RANDs are new and have been generated by the GSM network.

For billing for the service used by mobile units in GSM networks, what is known as the TAP protocol (TAP: Transferred Account Procedure) from the Transferred Account Data Interchange Group (TADIG) from the GSM agreement is known in the prior art. GSM is based on the concept of roaming, which allows a user of a mobile radio to use his mobile radio in any country and network. The billing for the service used is never trivial, however. Today, more than 400 GSM networks are in operation worldwide, and for these it is estimated that there are more than 20000 individual roaming agreements between the network operators. To allow billing, there is therefore an extremely complex process of information recording, information distribution and information evaluation behind the apparently simple idea of roaming. The Transferred Account Procedure protocol (TAP) is a method which mobile radio network service providers use to interchange roaming billing information. On 4 Jun. 2000, TAP2 and TAP2+ were finally followed by the launch of TAP3. TAP3 can be referred to as the standard today, even though TAP is a protocol which is being developed further.

Most voice or data traffic in GSM networks comes or ends in a different network than the one the mobile user is currently in. The operator of a local area network levies charges for each call which ends at one of its users, regardless of whether it is a landline network or a mobile radio network. The local fixed network operators therefore make reciprocal arrangements with the local mobile radio network operators to simplify the levying of the charges. This means that it is then also not necessary, in order to assign a call from a Swiss mobile radio network user to a Canadian landline network user, for the Swiss mobile radio network operator to make an agreement with the Canadian landline network provider. Normally, the Swiss landline network provider has already made an agreement regarding assignment type and charges with the Canadian landline network provider, and the Swiss mobile radio network operator assigns via the Swiss landline network provider with an appropriate agreement. The costs are normally assigned to the user either directly (retail billing) or via a service provider (wholesale billing). The type of assignment of roaming data or voice traffic between different mobile radio networks (PMN: Public Mobile Network) is made using the TAP protocol. Roaming call records are typically created either as TAP records or as CIBER (Cellular Intercarrier Billing Exchange Roamer) records. CIBER records are used by mobile radio network operators which use AMPS based technologies, such as AMPS, IS-136 TDMA and IS-95 CDMA. TAP is used particularly by GSM mobile radio network service providers and is the main protocol for assignments in GSM dominated regions.

Details of a call by a user who is in a foreign network (VPMN: Visited Public Mobile Network) are registered in a mobile switching center (MSC) for the network. Each call thus produces one or more call records. The GSM standard for these records is defined in GSM 12.05, although many providers use their own formats. The call records from the MSC are transmitted to a billing system for the VPMN for assignment. These call records are then converted to TAP format and associated with the relevant user. No later than within 36 hours, the TAP records are sent to the relevant mobile radio network service provider. The TAP files additionally contain information regarding the provider service tariff (IOT: Inter Operator Tariff) and all other bilateral agreements and privilege schemes. The TAP records are sent directly or, more usually, via an assignment point, such as a clearing house. When the home network operator (HPMN: Home Public Mobile Network) receives a TAP record from the VPMN, it is converted into an appropriate internal format and is assigned together with the normal call records from the user, which it produces in the home network. In the case of wholesale billing, where a service provider assigns the incurred costs to the user, the HPMN forwards the records to the service provider, which can reassign the calls, particularly also on the basis of its own tariffs, and produces the bill with call details, for example, for the user.

TAP3 supports a large number of services. TAP3 is used today for the billing between GSM service providers and GSM service providers, GSM service providers and non-GSM service providers (inter standard roaming) and GSM service providers and satellite service providers etc. The three fundamental categories of service Voice, Fax and what are known as Supplementary Services are already supported, since TAP1. By contrast, the billing for the short message service (SMS) is less trivial on account of the use of short message service centers (SMS-C) from third parties. Billing for SMS is more difficult for the following reasons: 1. a roaming user is able to receive an SMS while roaming (MT-SMS), 2. a roaming user is able to send an SMS (MO-SMS)

while roaming by using his home network's SMS-C, and 3. a roaming user is able to send an SMS (MO-SMS) while roaming by using a foreign network's SMS-C. Billing for SMS services is therefore fully supported only from TAP2+ onward. From TAP3 onward, billing for single circuit switched data, HSCSD (High Speed Circuit Switched Data) and GPRS (General Packet Radio Service), is also supported. TAP3 likewise supports all value added services (VAS), such as what is known as Billing for Content. The assignment of Value Added Services is frequently difficult, however, since it is assumed that the service provider is in agreement with the assigned services. Customized Application Mobile Enhanced Logic (CAMEL) is supported from TAP3.4 onward. CAMEL is important particularly for applications with prepaid services for roaming users and ought to become highly significant in future. Another important application of TAP3 is support for assignments based on Inter Operator Tariff (IOT). IOT allows the home network service provider (HPMN) to check special offers and tariffs from a foreign service provider (VPMN) and to pass them on to the roaming user. First, by way of example, the VPMN may provide privileges or discounts for different call services or levels and the HPMN can easily verify these and adjust its tariffs. The option of assigning roaming services regardless of where the user is currently situated is a valuable aid to mobile network service providers and prevents the loss of income in the event of interim privileges by a VPMN. From TAP3 onward, the TAP protocol likewise comprises detailed information regarding from precisely where a call has been made or a service has been used etc. and to where it was directed. This information assists in creating a profile for the respective user on the basis of his behavior, which provides important information for adjusting and optimizing the services offered to the users' needs. In particular, it can be used to provide special location based services, such as sporting or concert events etc. Finally, it allows TAP3 differentiated error handling with the Returned Accounts Procedure (RAP) protocol. Thus, RAP can be used by the HPMN to check incoming TAP files, inter alia, for their validity and conformity to the TAP standard and, if necessary, to reject them without thereby losing assignments for services. The current TAP version 3 can be referenced by document TD.57, for example.

The prior art has a wide variety of drawbacks, however. It is admittedly possible, for example with an EAP-SIM, to use the authentication methods from the GSM networks in wireless LAN technology in order to authenticate supplicants or remote access clients, provided that the user has an IMSI with a GSM service provider. In principle, it is likewise possible to use mobile IP from the IEFT (Internet Engineering Task Force), for example, to divert (route) data streams to the appropriate mobile remote access client registered with an access server via an access point. However, this is a long way from solving all problems of mobile network use, which would permit genuinely free roaming by the user. One of the problems is that the IP network no longer has the prerequisites required in the GSM standard with regard to security, billing and service authorization. This is intrinsically related to the open architecture of the IP protocol. That is to say that a large amount of information is missing in the IP standard, said information being absolutely necessary for compatibility with the GSM networks. In addition, an access server based on RADIUS, for example, delivers a single data stream. This cannot readily be mapped onto the multielement data stream of the GSM standard. Another drawback of the prior art is that wireless LANs are today based on individual hotspots (i.e. the basic service area of the access points of an access server) which are provided by different software and hardware developers throughout the world. This makes it difficult to combine the two worlds, since such gateway functions each need to be matched to the specific solution. The technical specifications relating to the GSM authentication interface can be found in MAP (Mobile Application Part) GSM 09.02 Phase 1 Version 3.10.0.

It is an object of this invention to propose a novel method for IP nodes, particularly for mobile IP nodes in heterogeneous WLANs. In particular, the aim is to allow a user to move easily between various hotspots (roaming) without needing to concern himself with registration, billing, service authorization etc. with the various WLAN service providers, i.e. he enjoys the same convenience as he is used to from mobile radio technology, such as GSM.

The present invention achieves these aims particularly by virtue of the elements of the independent claims. Other advantageous embodiments can also be found in the dependent claims and in the description.

In particular, the invention achieves these aims in that for content-based billing in IP networks an IP node uses an Internet service provider to access charge-incurring contents from one or more content providers in a network, in that the IP node, upon a request, transmits an IMSI stored on a SIM card from the IP node, and in that the transmitted IMSI from the IP node is stored in a database in a SIM-RADIUS module, where the SIM-radius module is used for performing authentication and/or service authorization for the IP node on the basis of the IMSI on the SIM card from the mobile node in an HLR and/or VLR for a GSM network and for transmitting it to the control gateway module, where access by the IP node to contents from a content provider in the network is routed via a control gateway module, and the control gateway module is used to check whether it incurs a charge on the basis of the destination address of the access, where a core engine module comprises means for recording access to the control gateway module, records call detail records on the basis of the service obtained by the IP node, the call detail records recording at least identity of the IP node and/or time period and/or provider of the service used and forwarding it to a billing module, and where the call detail records and/or clearing data and/or TAP files based on the call detail records are assigned using a billing system from a service provider or a bank. The billing module comprises means for producing TAP files on the basis of the service used, i.e. on the basis of the data from the core engine module, and can transmit them together with invoicing instructions to a clearing module, the clearing module assigning the service used by the user to a provider of a landline network and/or transmitting the TAP files to a GSM service provider and/or Internet service provider (ISP) for the purpose of assignment. The invoicing instructions may comprise at least user-specific and/or service-provider-specific assignment data, for example. The IP node used may be a mobile IP node in heterogeneous WLANs, for example, where the mobile IP node uses a wireless interface within a basic service area of a WLAN to access an access point in a WLAN, where the basic service area in the WLAN comprises one or more access points associated with an access server, and where the access server comprises the control gateway module and/or transmits appropriate data to the control gateway module. For the purpose of identification, a SIM user database and a SIM gateway module, for example, can be used to extend the logical IP data channel of the WLAN on a user-specific basis to form appropriate GSM data for signal and data channels of a GSM network. A call detail record can be created, by way of example, at least on the basis of the IP address of the IP node and identifications for the service providers whose service has been used by the IP node. A billing management database may comprise IP addresses and/or GSM identification for the users and/or service providers, for example. This has the advantage, inter alia, that seamless roaming between different and heterogeneous WLANs becomes possible. By combining WLAN technology, particularly in IP networks, with GSM technology, roaming becomes possible for the user without his needing to concern himself with registration, billing, service authorization etc. with the various WLAN service providers, i.e. the user enjoys the same convenience as he is used to from mobile radio technology, such as GSM. At the same time, it is possible in an entirely new way to combine the advantages of the open IP world (access to the worldwide Internet etc.) with the advantages (security, billing, service authorization etc.). The invention also makes it possible to produce a method for roaming in WLANs without each access server's having to be fitted with an appropriate module. On the other hand, the infrastructure (WLAN/GSM) can be adopted unchanged through the use of RADIUS. By way of example, assignment using a service provider's billing system can be effected by virtue of the billing system generating and/or providing files containing CDRs which are sent to clearing centers of the ISP or mobile operator, for example, and/or by virtue of the clearing centers fetching these CDR files from a billing system, for example.

In another variant embodiment, the TAP files are created at least on the basis of inter operator tariffs and also public mobile network TAP identification codes. In combination with this or as a separate variant embodiment, it is likewise conceivable, by way of example, for a billing management database to comprise inter operator tariffs and also public network TAP identification codes. This variant embodiment has the advantage, inter alia, that the home network service provider (HPMN) can simply verify the IOT of the foreign network service provider (VPMN) currently covering the user (roaming). This means that the VPMN can provide privileges, for example, for specific connections and the HPMN can check that these have been applied correctly. Regardless of any privilege programs or call levels of the VPMN, the HPMN can therefore also simply recalculate each connection and/or each call on the basis of his own tariffs, etc. The option of determining the prices for services regardless of what foreign network and/or home network is currently covering the user may be a valuable means for assigning services for an HPMN which can be used to avoid losing particular charge reductions from a VPMN, for example. Similarly, this first allows particular assignment schemes to be implemented for an HPMN, such as special prices for connections to the home network and/or home country for the user and/or, by way of example, calls within communities encompassing countries, such as Europe etc.

At this juncture, it should be stated that the present invention relates not only to the inventive method but also to a system for performing this method.

Variant embodiments of the present invention are described below using examples. The examples of the embodiments are illustrated by the following appended figures:

FIG. 1 shows a block diagram schematically illustrating an inventive method and a system for content-based billing in IP networks, where mobile IP nodes 20 are connected to a SIM card 201 via a contact-based interface and use a connection 48 to access a control gateway module and/or access points 21/22. The control gateway module and/or the access server 23 of the WLAN authenticates the IP node 20 on the basis of an IMSI stored on the SIM card 201 in an HLR 37 and/or VLR 37 for a GSM mobile radio network. Step 1102 shows one possible authentication, where, by way of example, a JAVA applet is loaded using a browser, the IMSI is read from the SIM card and appropriate authentication data are interchanged. Step 1103 shows the conversion process, where the IP from the IP node 20 is converted to SS7 and validation of the IMSI is requested from the HLR. In step 1104, the relevant billing and/or clearing data are finally generated and assigned.

Figure 2:
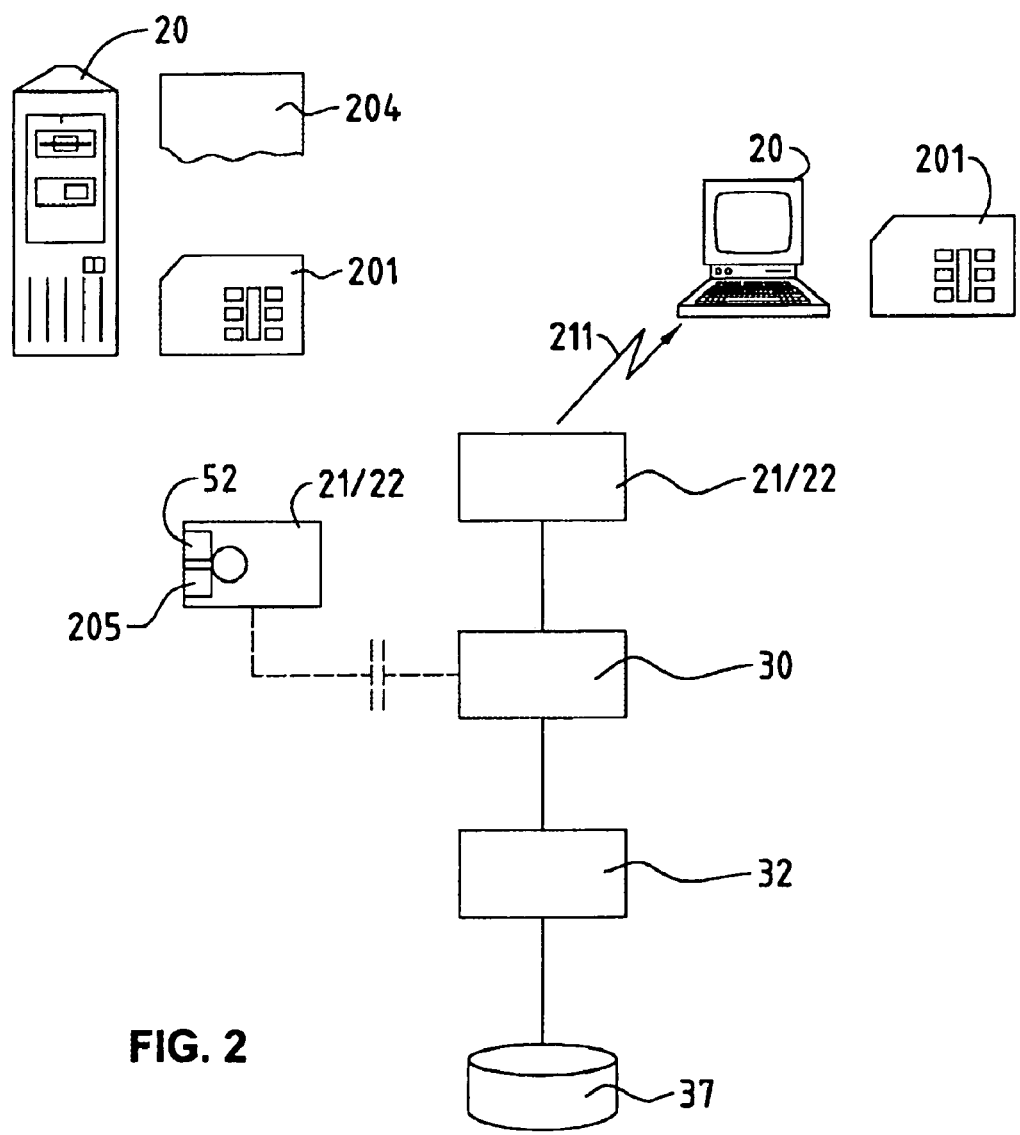
Figure 3:
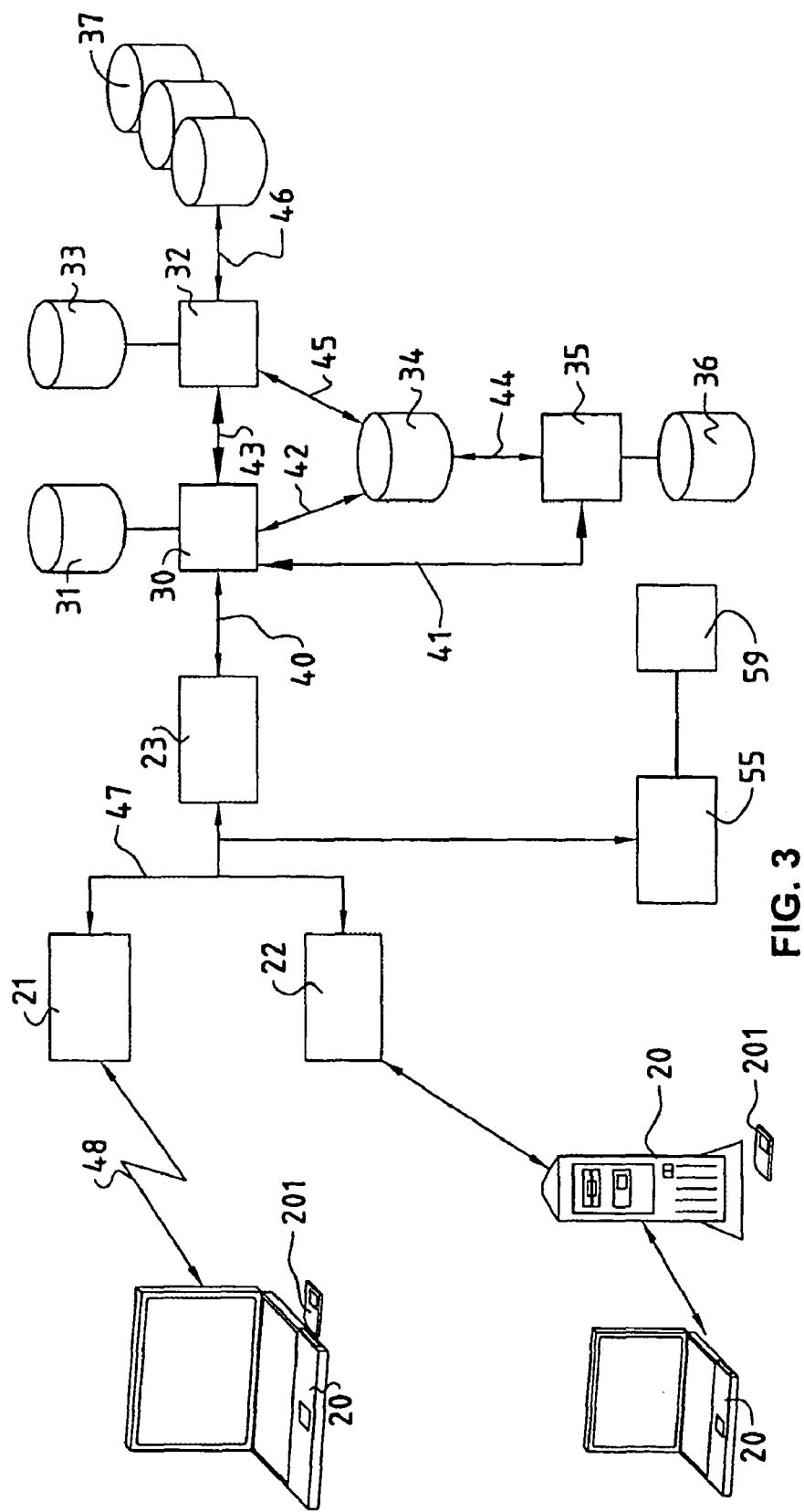

FIGS. 2 and 3 show a block diagram schematically illustrating an inventive method and a system for content-based billing in IP networks, where an IP node 20 uses an Internet service provider to access charge-incurring contents from one or more content providers in a network, and where the IP node 20 transmits, upon a request, an IMSI stored on a SIM card 201 from the IP node 20 to a control gateway module 22, and the IMSI from the IP node 20 is stored in a database in a SIM-RADIUS module 30.

FIG. 1 illustrates an architecture which can be used to implement the invention's authentication. FIG. 1 shows a block diagram which schematically illustrates an inventive method and a system for content-based billing in IP networks, where an IP node 20 uses an Internet service provider to access charge-incurring contents from one or more content providers in the network, and where the IP node 20 transmits, upon a request, an IMSI stored on a SIM card 201 from the IP node 20 to a control gateway module 22, and the IMSI from the IP node 20 is stored in a database in a SIM-RADIUS module 30. In FIGS. 1, 2 and 3, the reference symbol 20 relates to an IP node, particularly to a mobile node, which has the necessary infrastructure, including hardware and software components, to implement an inventive method and/or system as described. The IP node may be a permanently installed or a mobile IP node, for example. Thus, the IP node 20 may be a PC or otherwise a permanently installed IP compatible network appliance, for example. If it is a mobile node 20, it is to be understood to mean, inter alia, all possible "customer premises equipment" (CPE) which is provided for use on various network sites and/or various networks. By way of example, these comprise all IP compatible appliances, such as PDAs, mobile radio telephones and laptops. The mobile CPEs or nodes 20 have one or more different physical network interfaces which can also support a plurality of different network standards. The physical network interfaces of the mobile node may comprise, by way of example, interfaces for WLAN (Wireless Local Area Network), Bluetooth, GSM (Global System for Mobile Communication), GPRS (Generalized Packet Radio Service), USSD (Unstructured Supplementary Services Data), UMTS (Universal Mobile Telecommunications System) and/or Ethernet or another wired LAN (Local Area Network), etc. The reference number 48 accordingly stands for the various heterogeneous networks, such as a Bluetooth network, e.g. for installations in covered localities, a mobile radio network with GSM and/or UMTS, etc., a wireless LAN, e.g. based on IEEE wireless 802.1x, or else a wired LAN, i.e. a local area landline network, particularly including the PSTN (Public Switched Telephone Network), etc. In principle, it can be stated that the inventive method and/or system is not tied to one specific network standard, if the inventive features are present, but rather can be implemented with any desired LAN. The interfaces 202 of the IP node may be not only packet-switched interfaces, as used directly by network protocols such as Ethernet or Tokenring, but also circuit-switched interfaces, which can be used by means of protocols such as PPP (Point-to-Point Protocol), SLIP (Serial Line Internet Protocol) or GPRS (Generalized Packet Radio Service), i.e. which interfaces do not have a network address like an MAC or DLC address, for example. As mentioned to some extent, the communication can be effected using the LAN, for example using special short messages, e.g. SMS (Short Message Services), EMS (Enhanced Message Services), using a signaling channel, such as USSD (Unstructured Supplementary Services Data), or other techniques, like MExE (Mobile Execution Environment), GPRS (Generalized Packet Radio Service), WAP (Wireless Application Protocol) or UMTS (Universal Mobile Telecommunications System) or using IEEE wireless 802.1x or another useful channel. The mobile IP node 20 may comprise a mobile IP module and/or an IPsec module. The primary task of the mobile IP is to authenticate the mobile IP node 20 in the IP network and to divert the IP packets which have the mobile node 20 as destination address as appropriate. For the other mobile IP specifications, see also IEFT (Internet Engineering Task Force) RFC 2002, IEEE Comm. Vol. 35 No. 5, 1997 etc. Mobile IPs, for example, are supported by IPv6 and IPv4, in particular. The mobile IP capabilities can preferably be combined with the security mechanisms of an IPsec (IP security protocol) module in order to guarantee secure mobile data management in the public Internet. IPsec (IP security protocol) produces authentication/confidentiality mechanisms between network nodes, which both use IPsec, on a packet-by-packet or socket-by-socket basis. One of the flexibilities of IPsec is particularly that it can also be configured for individual sockets on a packet-by-packet basis, however. IPsec supports IPvx, particularly IPv6 and IPv4. For more detailed IPsec specifications, see Pete Loshin: IP Security Architecture; Morgan Kaufmann Publishers; 11/1999 or A Technical Guide to IPsec; James S et al.; CRC press, LLC; 12/2000 etc., for example. Although IPsec has been described in this exemplary embodiment as an example of the use of security protocols at IP level, all possible other security protocols or mechanisms or even the omission of security protocols are conceivable in accordance with the invention.

In addition, the IP node 20 is connected to a SIM card 201 (SIM: Subscriber Identity Module), storing an IMSI (International Mobile Subscriber Identifier) for a user of GSM networks, via a contact-based interface. In the case of IP nodes 20 in a landline network, the IP node 20 is provided with access, for example, by means of xDSL, dialup using the public switched telephone network using PPP or routed local area network etc. etc., for example access to the worldwide backbone network Internet or another network connected to the content providers. The SIM-RADIUS module 30 is used to perform authentication and/or service authorization for the IP node 20 on the basis of the IMSI on the SIM card 201 from the node 20 in an HLR 37 and/or VLR 37 for a GSM network and transmit it to the control gateway module (22). In the case of mobile IP nodes 20, for the purpose of authentication the IP node 20 uses a wireless interface 202 within a basic service area of a WLAN to ask an access point 21/22 for access to the WLAN. As already described, the various WLANs from different hotspots can comprise heterogeneous network standards and protocols, such as WLAN based on IEEE wireless 802.1x, Bluetooth etc. The basis service area of the WLAN comprises one or more access points 21/22 associated with an access server 23. The mobile IP node 20 transmits, upon a request from the access server 23, an IMSI stored on the SIM card 201 from the mobile IP node 20 to the access server 23. The IMSI from the mobile IP node 20 is stored using a SIM-RADIUS module 30. On the basis of the IMSI, information stored in a SIM user database 34 is used to extend the logical IP data channel of the WLAN on a user-specific basis to produce appropriate GSM data for signal and data channels of a GSM network. The GSM system comprises data channels, known as traffic channels, and control signal channels, known as signaling channels. The traffic channels (e.g. TCH/FS, TCH/HS, TCH/F9, 6/4.8/2.4 and TCH/H4.8/2.4 etc.) are reserved for user data, while the signaling channels (e.g. CCCH: Common Control Channels, RACH: Random Access Channels, DCCH: Dedicated Control Channels, CBCH: Cell Broadcast Channel etc.) are used for network management, control functions etc. The logical channels cannot all be used simultaneously by the interface, but rather only in particular combinations using the GSM specifications. Using a SIM gateway module 32, the necessary SS7/MAP functions are generated in order to perform the authentication of the IP node based on the GSM data, the SIM-RADIUS module 30 using SIM user database 34 and SIM gateway module 32 to perform the authentication for the mobile IP node on the basis of the IMSI on the SIM card 201 from the mobile node 20 in an HLR 37 (Home Location Register) and/or VLR 37 (Visitor Location Register) for a GSM network.

The IP node 20 can be authenticated using the Extensible Authentication Protocol, for example. For the EAP based method for authenticating a user and for allocating session keys to the user using the GSM Subscriber Identity Module (SIM), the following challenge-response method can be used, for example. The SIM card's authentication algorithm is provided with a 128-bit random number (RAND) as challenge. The SIM card then executes a confidential algorithm which is specific to the respective operator and which receives as input the random number RAND and a secret key Ki stored on the SIM card and generates a 32-bit response (SRES) and a 64-bit key Kc therefrom. Kc is used for encrypting the data transfer by wireless interfaces (GSM Technical Specification GSM 03.20 (ETS 300 534) "Digital cellular telecommunication system (Phase 2); Security related network functions", European Telecommunications Standards Institute, August 1997). For authentication, a plurality of RAND challenges for generating a plurality of 64-bit Kc keys are used. These Kc keys are combined to produce a longer session key. For mobile IP node 20, the system between the access point 21 and the access server 23 may comprise, as mentioned, an IEEE 802.1x port-based authentication method, the mobile IP node 20 (Remote Access Client/Supplicant) being authenticated with the access server 23 (authentication server) by means of the access point 21 (authenticator). In this exemplary embodiment, the WLAN is based on IEEE 802.11. In the case of IP nodes 20 in a landline network, the same method can be carried out using the control gateway module 22. In order to perform the GSM authentication, the SIM gateway module 32 works as a gateway between the Internet Authentication Service (IAS) server network and the GSM authentication infrastructure, i.e. the control gateway module 22 or the access point 22 (access server 23) and the HLR 37 or the VLR 37. At the start of the EAP/SIM authentication, the control gateway module 22 uses a first EAP request 1 through the control gateway module 22 to ask the IP node 20 for the international module subscriber identity (IMSI) for the user, inter alia. In a WLAN, it is the access server 23 which uses a first EAP request 1 through the access point 22 to ask the mobile IP node 20 for the international mobile subscriber identity (IMSI) of the user, inter alia. This is transmitted from the IP node 20 using EAP response 2 to the control gateway module 22 or the access point 21. With the IMSI, the access server 23 receives n GSM triplets upon a triplet request denoted by the relevant HLR 37 or VLR 37. Based on the triplets, the access server 23 can receive a message authentication code for n*RAND and a service life for the key (together MAC_RAND) and also a session key. In a 3rd EAP step 3, the access server 23 then sends an EAP request of type 18 (SIM) to the mobile IP node 20 and receives the corresponding EAP response 4. EAP data packets of type SIM additionally have a special subtype field. The first EAP request/SIM is of subtype 1 (start). This packet contains the list of EAP/SIM protocol version numbers which are supported by the access server 23. The EAP response/SIM (start) 4 from the IP node 20 contains the version number selected by the IP node 20. The IP node 20 needs to select one of the version numbers indicated in the EAP request. The EAP response/SIM (start) from the IP node 20 likewise contains a service life proposal for the key and a random number NONCE_MT which has been generated by the IP node. All subsequent EAP requests all contain the same version as the EAP response/SIM (start) data packet from the IP node 20. As mentioned, this variant embodiment has a SIM gateway module 32, which acts as a gateway between the access server 23 and the HLR 27 or the VLR 37, in order to perform the GSM authentication. When the EAP response/SIM has been received, the access server 23 receives an n GSM triplet from the HLR/VLR 37 for the GSM network. From the triplets, the access server 23 calculates MAC_RAND and the session key K. The calculation of the cryptographic values of the SIM-generated session key K and of the message authentication codes MAC-RAND and MAC_SRES can be taken from the document "HMAC: Keyed-Hashing for Message Authentication" by H. Krawczyk, M. Bellar and R. Canettti (RFC2104, February 1997), for example. The next EAP request 5 from the access server 23 is of the SIM and Subtype Challenge type. The request 5 contains the RAND challenges, the key's service life chosen by the access server 23, a message authentication code for the challenges and the lifetime (MAC_RAND). When the EAP request/SIM (challenge) 5 has been received, the GSM authentication algorithm 6 is executed on the SIM card and calculates a copy of MAC_RAND. The mobile IP node 20 checks that the calculated value of MAC_RAND is the same as the received value of MAC_RAND. If no match is produced for the two values, the mobile IP node 20 terminates the authentication method and does not send any of the authentication values calculated by the SIM card to the network. Since the value RAND is received together with the message authentication code MAC_RAND, the IP node 20 can ensure that RAND is new and has been generated by the GSM network. If all the checks have been correct, the IP node 20 sends an EAP response/SIM (challenge) 7 containing, as response, MAC_SRES for the IP node 20. The access server 23 checks that MAC_RES is correct and finally sends an EAP Success data packet 8 which indicates to the IP node 20 that the authentication was successful. The access server 23 can additionally send the received session key with the authentication message (EAP Success) to the access point 22 or the control gateway module 22. In the event of successful authentication, a location update is performed in the HLR 37 and/or VLR 37 and the IP node 20 receives an appropriate entry in a customer database for the access server. In the case of IP nodes 20 in landline networks and in the case of mobile IP nodes 20 in WLANs, an appropriate entry is made in a memory module in the control gateway module 22.

If an IP node 20 or the IMSI has been authenticated, the IP node 20 can be used to request access to contents, e.g. in charge-incurring files from content providers. For the IP node 20 to access contents from a content provider in the network, the access is routed via the control gateway module 22. Using the control gateway module 22, the destination address is taken as a basis for checking whether the access incurs a charge. The content provider referred to is the one which produces the contents and/or publishes and markets them on the Internet. The content is not transferred to the ISP but rather remains in the authority of the content provider. Content providers market and sell the services which are billed for using the inventive system. Service providers normally transmit the contents from the content providers via their network to the users and/or allow a user to access such contents. The inventive system and/or method can be used by service providers to assign such charge-incurring services from the content providers, regardless of where this service is set up or provided, to their customers and thus to provide a payment and clearing service. A core engine module records call detail records when accessing the control gateway module 22 on the basis of the service obtained by the IP node 20, the call detail records comprising at least identity of the IP node 20 and/or time period and/or provider of the service used and forwarding them to a billing module. The call detail records and/or clearing data and/or TAP files based on the call detail records are assigned using a billing system 55 for a service provider or a bank. Besides the means for authenticating a user which have been described above, the inventive system's infrastructure essentially comprises two further components which are of significance for installation and integration. The two components are the core engine module 59 and the aforementioned control gateway module 22. The interaction and the tasks of the two components are explained below.

The control gateway module 22 identifies any access by a user to premium content, that is to say a charge-incurring service from a content provider. The control gateway module 22 works like a gateway or checking entity for access to the premium content and rejects or grants access to the services of the content providers. To this end, the web requests from a user or an IP node 20 are routed to the control gateway module 22 instead of sending them directly to the content provider. Incoming requests are checked by the control gateway module 22 using the destination address (URL) to check whether they "incur a charge". Before access is permitted, the control gateway module 22 establishes the identity of the user as described above using the IMSI and RADIUS servers. The control gateway module 22 requests the further instruction from the core engine module 59 using this authentication information. The content providers can install, by way of example, a hardware-based and/or software-based logic, for example using a JAVA applet etc., in their web page, which diverts the access by a user to the appropriate control gateway module 22. By way of example, a script code can be used to request the correct route for the user request from a network module, as a result of which the request about the structure of the HTML page are diverted onto this path by HTTP Redirects, or similar methods. Using the control gateway module 22, the user can now access the premium content or the services of the content provider. The control gateway module 22 requires the connection to the core engine module 59 in order to present the information relating to the transaction to the user and to control and document the access operations to the premium content. The control gateway module 22 may be installed or integrated in the service provider's network, for example, in a similar manner to a proxy server. The control gateway module 22 holds no context information and can therefore simply be used and scaled in load balancing environments, such as DNS Robin or Web Switches.

The core engine module 59 communicates with the control gateway module 22 and generates data for the billing. Every time a user wishes to obtain charge-incurring services via an IP node 20, the transaction is monitored and documented by the core engine module 22. A record is made of which user requests which URL at what price at what time and confirms the payment. For billing, a price list may be defined by the content provider, for example, and stored in a core engine database so that it can be accessed. In order to perform a transaction and generate a billing data record, the core engine module 59 needs to identify or authenticate the user (see above), indicate to him the price information for the requested service from the database and, on the basis of user confirmation, to provide or block access to the service. Whether a transaction is provided may be dependent, in particular, on what limits have been set by the service provider and by the user himself, filter settings from the user and other profile settings and general guidelines. The core engine module 59 may be in the form of a JAVA application, for example, i.e. may be implemented with cross-platform capability, and may thus be used on a large number of application server platforms. The database used for the core engine module 59 may be a relational database corresponding to the JDBC standard, for example. The core engine module 59 requires an interface for the authentication method described above in order to identify the individual users. In addition, the core engine module 59 can comprise an interface for the billing system of the service provider in order to safeguard the necessary data for the billing with the users (for example as a monthly total bill). The price list can be presented using a product or service catalog which contains a list of services and the associated prices for premium content. In order to identify premium content, the inventive method can use a similar technology as is used for what is known as black list management. That is to say the Internet addresses (URLS) are evaluated using the core engine module 59 and/or control gateway module 22. The content provider uses the price list to define, for particular regions of his web site, prices which provide access to the premium contents. The following example shows a few possible price entries:

| URL | Protection/time | Price |
|---|---|---|
| http://www.somenewsprovider.com/stocks/*.html | 5 | 1 |
| http://www.somenewsprovider.com/stockarch/*.htm | 5 | 3 |
| http://www.somenewsprovider.com/archive/1440 | 1440 | 5 |

In this example, a content provider wishes to sell market information to the users for 1 EURO per retrieval. For the market search in the archive, he requires 3 EUROS, and the search in the general archive is intended to be possible for 24 hours (1440 minutes) and to cost 5 EUROS. In line with this example, the content provider can merely structure the content on his web server such that it sets up the relevant price model. In addition, the content provider can define the access rules, for example, such that the users of the service provider can access the premium content directly without further registration on the web site. Public contents can continue to be transported by the public route even when the inventive method and/or system is used. Only access operations intended for premium content are to be routed via the system—specifically this is the control gateway module 22 which authorizes and controls the data transfer. By way of example, a flexible element may also be an additional authentication agent which communicates with the service provider's interface in order to request identification of the account behind an IP address. By way of example, the authentication agent could set up a TCP connection to the authentication interface in order to send the request. However, it is also possible to use any other interworking, such as protection by means of SSL, use of database queries (JDBC, ODBC, native interfaces etc.), for this purpose. An authentication agent of this kind is no longer required on the basis of the RADIUS authentication already performed, however, but rather can be used for further increasing the security of the system, for example.

To stipulate dimensions to the hardware of the control gateway module 22, it is possible to use the number of possible, simultaneous connections from a router to the control gateway module 22, for example. As a rule of thumb, it may be assumed, by way of example, that 10% of the users who are logged in on the Internet at the same time are simultaneously the cause of a connection on the control gateway module 22. The number of network cards may be dimensioned, by way of example, such that the calculated number of simultaneous connections on the control gateway module 22 can be processed. As a guideline, it may be that a 100-Mbit NIC can process approximately 1400 HTTP calls per second, for example. The control gateway module 22 may have similar characteristics to a proxy server, for example: (1) the control gateway module 22 works like a proxy server: a new outgoing connection (to the web server) is set up (http or https) for an incoming connection (from the browser); (2) an outgoing connection to the core engine module 59 is set up (https) for an incoming connection, if it incurs a charge. To rule out the influencing factors among the connections as far as possible, it may be appropriate to provide a separate network interface for each direction of the communication. The following calculations may be used as a basis for ascertaining the necessary hardware, for example:

| Description | Calculation | Result |
|---|---|---|
| For each 100-Mbit NIC up to 1400 http requests per second can be implemented | | 1400 http/sec |
| When using HTTPS, approximately ¼ of HTTP throughput can be achieved | 1400/4 | 350 https/sec |
| The request peak (peak of simultaneous requests per second) is approximately 20% of the active users | 350 * 5 | 1750 simultaneous payment users |
| We estimate the payment peak (peak of simultaneous users requesting payment transactions) to be 1% of the active user base | 1750 * 100 | 175 000 simultaneous Internet users |

The control gateway module 22 may contain no context information about user connections, for example. Accordingly, it is possible to use standard load distribution mechanisms to distribute the requests over a plurality of machines, such as over DNS Robin and/or Web Switches. Should a high level of availability be desired, it may be appropriate, by way of example, to calculate the system with at least twice the hardware. The hardware may be equipped with a suitable operating system, for example, such as Sun Solaris and/or Linux/Intel and/or FreeBSC/Intel etc. The control gateway module 22 may correspond in function to a reverse HTTP server, which, like a proxy server, is positioned as a gateway between the customer and the content server. The software may be developed on the basis of the HTTP/1.1 standard, for example, and meets the demands on a gateway based on RFC 2068. The control gateway module 22 can operate as a server process, for example, which can be installed and started under user authorizations. The privileged port 80 (http standard port) may be used, for example, but it may be appropriate to set up access as port redirect.

It is important to point out that the inventive system allows service providers to assign services from the content providers, regardless of where this service is set up or provided, to their customers and in this way to provide a payment and clearing service. In particular, the present system achieves a high security standard both for the service provider (ISP), the content provider and the user when billing for charge-incurring contents, this not being possible using the conventional system based on the prior art.

The invention claimed is:

1. A computer-based method for content-based billing in Internet Protocol (IP) networks, comprising the steps of:
   requesting access from an IP node to an access server over a network to a control gateway module, for accessing charge-incurred contents from a content provider;
   transmitting an International Mobile Subscriber Identity (IMSI) stored on a Subscriber Identity Module (SIM) of the IP node to the control gateway module of the access server, upon request by the access server;
   storing the received IMSI from the IP node in a database of a Remote Authentication Dial In User Service (RADIUS) module of the access server;
   authenticating the IP node on a basis of the received IMSI of the IP node by the RADIUS module, the RADIUS module accesses at least one of a Home Location Register (HLR) or a Visiting Location Register (VLR) of a GSM network;
   transmitting a result of said step of authenticating from the RADIUS module to the access server to allow or deny an access of the charge-incurring contents by the IP node;
   transmitting an authentication code included in said result of said step of authenticating from the access server to the IP node, to allow the IP node to accept or deny the result of said authenticating;
   requesting access to the charge-incurring contents by the IP node from an Internet service provider to access the content provider in the IP network, the request to access the charge-incurring contents made via the control gateway module;
   routing the charge-incurred contents from the content provider to the IP node via the control gateway module, after a successful step of accessing; and
   recording access records including an identity of the IP node, an identity of the content provider, and cost information for the requested charge-incurring contents at a core engine module, by a communication between the control gateway module and the core engine module, to generate billing information.

2. The computer-based method for content-based billing according to claim 1, wherein said step of transmitting the authentication code further comprises:
   transmitting the authentication code from the access server to the IP node, indicating that the step of authenticating was successful;
   performing an authentication algorithm on the SIM of the IP node, to verify whether the authentication code has been generated by the GSM network; and
   sending a response from the IP node to the access server indicating that the step of performing the authentication algorithm was successful.

3. The computer-based method for content-based billing according to claim 1, further comprising the step of:
   extending a logical IP data channel of the network on a user-specific basis based on the IMSI at the access server, in said step of authenticating the IP node.

4. The computer-based method for content-based billing according to claim 1, further comprising the steps of:
   sending the access records from the core engine module to a billing module; and
   generating a detailed call record at the billing module, by linking the access records to the Internet service provider used for accessing the charge-incurred contents.

5. The computer-based method for content-based billing according to claim 1, further comprising the step of:
   evaluating an Internet address of the content provider by at least one of the core engine module or the control gateway module, to determine a price for the charge-incurring contents based on information in a billing management database.

6. The computer-based method for content-based billing according to claim 1, further comprising the step of:
   generating Transferred Account Procedure (TAP) files for the GSM network based on the access records at the core engine module; and
   sending the TAP files to a provider of a home GSM network of the IP node for billing purposes.

7. The computer-based method for content-based billing according to claim 1, wherein said step of transmitting further comprises:
   transmitting a GSM triplet from at least one of the VLR or HLR of the GSM network to the access server.

8. A computer system for content-based billing in Internet Protocol (IP) networks, comprising: an IP node having a Subscriber Identity Module (SIM); an access server; a control gateway module in connection with the IP node over a network; a Remote Authentication Dial In User Service (RADIUS) module in connection with access server; an Internet service provider in connection with the IP node over the network; a content provider having charge-incurred contents; and a core engine module for billing purposes, wherein
   the IP node is configured to request access to the access server over the network to the control gateway module, for accessing the charge-incurred contents from a content provider, and is configured to transmit an International Mobile Subscriber Identity (IMSI) stored on the SIM to the control gateway module of the access server, upon request by the access server;
   the RADIUS module is configured to store the received IMSI from the IP node in a database that is in connection with the access server, is configured to authenticate the IP node on a basis of the received IMSI of the IP node, and the RADIUS module is configured to access at least one of a Home Location Register (HLR) or a Visiting Location Register (VLR) of a GSM network, and is configured to transmit a result of said authenticating from the RADIUS module to the control gateway module of the access server to allow or deny an access of the charge-incurring contents by the IP node;
   the access server is configured to transmit an authentication code included in said result from the access server to the IP node to allow the IP node to accept or deny the result of the authenticating by the RADIUS module;
   the IP node is further configured to request access to the charge-incurring contents from the content provider in the IP network over the Internet service provider, the request to access the charge-incurring contents made via the control gateway module;
   the control gateway module is configured to route the charge-incurred contents from the content provider to the IP node, after a successful request for accessing the charge-incurring contents; and
   the core engine module is configured to record access records including an identity of the IP node, an identity of the content provider, and cost information for the requested charge-incurring contents, by a communication between the control gateway module and the core engine module, to generate billing information.

9. The computer system for content-based billing according to claim 8, wherein
the access server is configured to transmit the authentication code from the access server to the IP node, indicating that the authenticating at the RADIUS module was successful; and
the IP node is configured to perform an authentication algorithm on the SIM, to verify whether the authentication code ahs been generated by the GSM network, and is configured to send a response from the IP node to the access server indicating that the performance of the authentication algorithm was successful.

10. The computer system for content-based billing according to claim 8, wherein
the access server is configured to extend a logical IP data channel of the network on a user-specific basis based on the IMSI.

11. The computer system for content-based billing according to claim 8, the system further including a billing module, wherein
the core engine module is further configured to send the access records from the core engine module to the billing module, and
the billing module is configured to generate a detailed call record by linking the access records to the Internet service provider used to access the charge-incurred contents.

12. The computer system for content-based billing according to claim 8, wherein
the core engine module or the control gateway module is configured to evaluate an Internet address of the content provider, to determine a price for the charge-incurring contents based on information in a billing management database.

13. The computer system for content-based billing according to claim 8, wherein
the core engine module is configured to generate Transferred Account Procedure (TAP) files for the GSM network based on the access records at the core engine module, and is configured to send the TAP files to a provider of a home GSM network of the IP node for billing purposes.

14. The computer system for content-based billing according to claim 8, wherein
the access server is configured to receive a GSM triplet from at least one of the VLR or HLR of the GSM network when the RADIUS module performs the authentication.

* * * * *